United States Patent [19]

Foltz

[11] Patent Number: 5,433,410
[45] Date of Patent: Jul. 18, 1995

[54] DRAIN VALVE

[76] Inventor: Timothy J. Foltz, Rte. 1, Box 2190, Berryville, Va. 22611

[21] Appl. No.: 250,771

[22] Filed: May 27, 1994

[51] Int. Cl.⁶ .................................................. F16K 3/26
[52] U.S. Cl. ............................... 251/100; 251/322; 251/323; 251/351; 251/353; 251/354
[58] Field of Search ............... 251/100, 322, 323, 351, 251/353, 354

[56] References Cited

U.S. PATENT DOCUMENTS

| | | | |
|---|---|---|---|
| 1,182,375 | 5/1916 | Hutson | 251/100 X |
| 1,805,537 | 5/1931 | Allan | 251/322 |
| 2,506,722 | 5/1950 | Kuehn | 251/353 X |
| 2,591,514 | 4/1952 | Courtot | 251/353 X |
| 2,690,895 | 10/1954 | Barcus | 251/353 X |
| 3,294,118 | 12/1966 | Wieden | 251/354 X |

*Primary Examiner*—Robert G. Nilson
*Attorney, Agent, or Firm*—Robert E. Bushnell

[57] ABSTRACT

A drain valve for replacement of drain plugs or drain valves to facilitate the quick drainage of fluid from an equipment. The drain valve has a tubular housing assembly having a threaded section to be threaded into a threaded drain hole and a hexagonal nut section for assisting in mounting or removing the tubular housing assembly to threaded into or from the drain hole. A valve stem assembly has a valve stem which extends through the tubular housing assembly and has an actuator which an operator can push to open the drain valve. A compression spring disposed between the valve stem assembly and the tubular housing assembly provides a force on the actuator to force the drain valve into a closed position. Inlets in the valve stem permit fluid to flow through a drainage bore in the valve stem when the drain valve is in the open position.

23 Claims, 3 Drawing Sheets

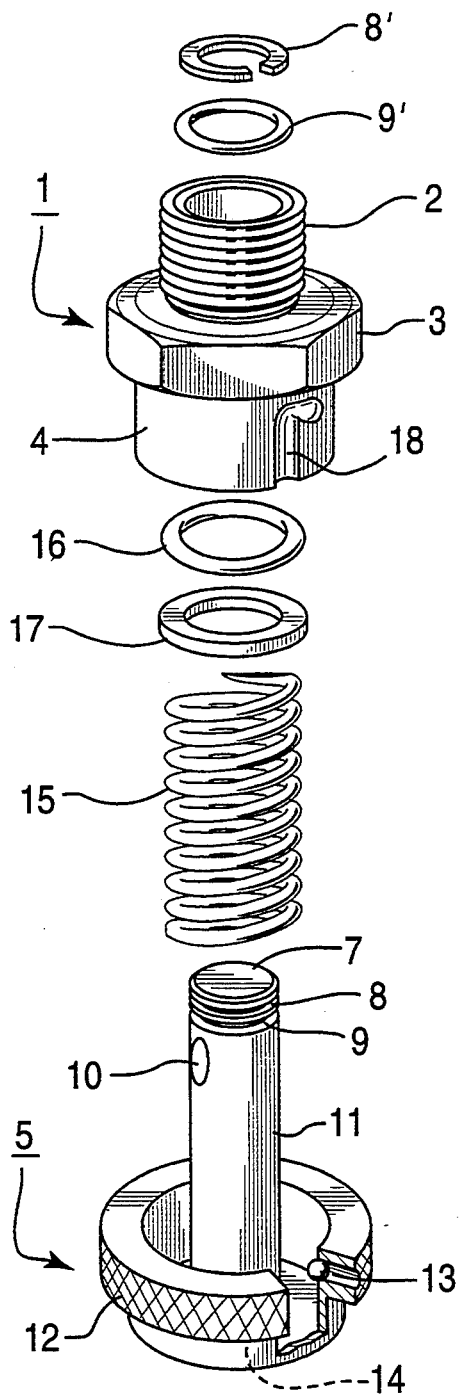
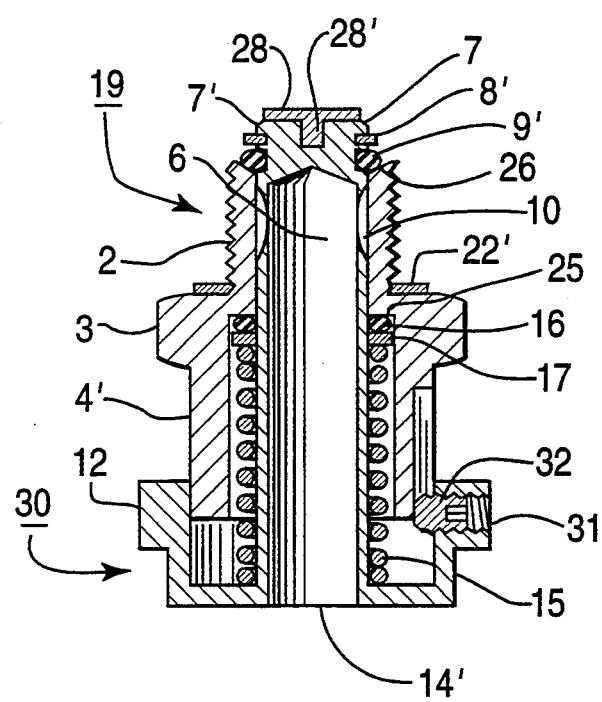
*FIG. 3*
*FIG. 4*

DRAIN VALVE

BACKGROUND OF THE INVENTION

1. Field of the Invention

This invention relates to a drain valve or drain cock and more particularly, an improved drain valve used for draining fluids of any type and useful in applications for draining fluid such as oil, gas, air, water, antifreeze, etc. Further, the invention finds use as a replacement valve for existing drain valves, the invention being easier to operate as will be determined by the disclosure of the preferred embodiments and appended claims.

2. Description of the Prior Art

As is well known, proper maintenance of various machinery, such as airplanes, automobiles, boats, etc., using such fluids as lubricating oils, gasoline, diesel, antifreeze, water, etc., requires the frequent drainage of such fluids to determine, by inspection, the conditions of the machinery and the fluid, and for scheduled and non-scheduled replacement of the fluid. Further machinery such as an air compressor tank requires drainage of unwanted built-up fluids such as water or other fluid lines having an unwanted concentration of air that need bleeding off.

A drain plug, requiring removal, is commonly used in most instances mentioned above, whereas in other instances, drain valves requiting the operator to rotate a threaded valve to open or close it. In both instance, use of some type of hand held tool is required to assist in the removal or opening of the drain plug or drain valve.

Other known types of drain valves are of the push-pull type having a resilient spring forcing the closure of the valve, the valve being opened by the operator pushing or pulling an actuator to overcome the force of the spring. William Beardsley, discloses such a push-pull type of valve in U.S. Pat. No. 218,698, patented on Aug. 19, 1879. Beardsley's valve found use as a bottle stopper, and contemplated use within a faucet, and uses the force of the spring to hold the valve in a closed position. Beardsley's valve comprised a tubular shaped valve stem having an closed end, closed by a plug, extending into the bottle and an inlet through the side of the valve stem extending into the bore of the tube for allowing fluid to flow through the tube to an open end of the valve stem external to the bottle. The spring forces the inlet up into the neck of the bottle to prevent fluid from flowing from the tube. A seal formed by an elastic flange is disposed around the plug and is adapted to fit snugly against the inside of the bottle to prevent the fluid from passing the elastic flange until the valve is opened by pushing the open end of the valve stem in a direction opposite the force of the spring. Beardsley's valve/stopper has a problem in that the elastic flange needed to be resilient enough to allow the stopper to be inserted into and removed from the bottle. Accordingly, there was no means provided to ensure the stopper remain seated in the neck of the bottle, and lacked means to maintain the valve in an open position absent the pressure applied thereto by the operator.

The *Quickly Disassembled Inflation and Relief Valve* disclosed by H. H. Mackal in U.S. Pat. No. 2,855,946 also uses the force of a spring to close the valve to prevent fluid, i.e., air from passing through an inlet disposed into the side of the valve stem and extending into the tube formed therein. Mackal's valve is opened by pressing the open end of the valve stem against the force of the spring. Mackel's valve differs from Beardsley's in that Mackal's valve includes a valve body having an end that extends into a flexible tube, the end having conical zones to seal the valve against the inner surface of the flexible tube. The inlet to the Mackal's valve stem is covered by the conical zoned end of the valve body and air is prevented from reaching the inlet by a rubber-like annular washer which is recessed into the conical zoned end of the valve when in a closed position. A cylindrical portion of Mackal's valve body that is disposed to the outside of the flexible tube through which the valve stem travels has a slot allowing for a pin in the side of the valve stem to travel when opening the valve. The cylindrical portion also has a notch therein where the operator seats the pin to maintain the valve in a closed position to prevent the valve from being opened accidentally. Accordingly, Mackal's valve also fails to provide any means, absent the operators force applied to the open end of the valve stem, for holding the valve in an open position.

The *Hand-Held Drain Valve Operating Receptacle* disclosed in U.S. Pat. No. 3,198,016 to R. H. Poorman comprises a tubular valve body in which a valve stem is seated. A spring in provided which fits over the valve stem and within the tubular body of the valve body. Poorman's valve stem differs from that of Beardsley and Mackal, in that the fluid, i.e. gasoline, does not flow through the Poorman's valve stem because it is not tubular and has no inlets or outlets. Poorman's tubular valve body comprises a threaded section adapted to be threaded into the gas tank of an aircraft. An inlet is provided on the side of the valve body next to the threaded end. Fluid is prevented from passing from the inlet to the outlet portion of the valve body by an O-ring, around one end of the valve stem, forced into a sealed position by the spring. In order to open the Poorman's drain valve a metal rod has to be inserted through the outlet portion of the valve body in order to apply a force opposite the force of the spring to move the O-ring past the inlet portion of the valve body. Accordingly, Poorman's drain valve does not have any means for holding the valve in an opened position. Poorman's outlet portion of the valve body has a hexagonal shape to allow for the use of a tool so that the body may be screwed and tightened into the gasoline tank, and has openings in the hexagonal portion for attaching a wire secured to the aircraft's wing to prevent valve body from rotating once installed.

The *Rotatable Bayonnet-Type Coupling* disclosed by Oetiker in U.S. Pat. No. 3,858,910 comprises a spring biased valve having an arrangement for locking open a valve, wherein locking pins 14 attached to the valve stem 17 slide through groove 16 into slot 15 and then, as the valve stem in rotated clockwise, lock into notch 18. Once the valve is rotated counter clockwise to align pins 14 with slots 16 the spring 11 will force the valve into a closed position.

Laipply, et al. disclose in U.S. Pat. No. 4,745,894 an *Oil Drain Valve* having a tubular housing with a threaded end to be threaded into a conventional drain hole of an oil pan, a central portion of hexagon shape for reception of a tool to aid in the insertion of the valve body into the oil pan, and an external cylindrical external end. The external cylindrical end includes a beveled end and a locking annular ball groove for attaching a cap or a conduit end fitting. A tubular valve steam has an open end and a closed end. Inlets are provided in the side of the valve stem near the closed end. Further, the closed end of the valve stem has a lip which must be deformed to allow the valve stem to be inserted through the valve body, and thereafter the lip is swaged to a radial position to support a seal and prevent the valve stem from being removed from the valve body. A spring is provided between the valve stem and the inner portion of the tube of the valve body to force the valve into a closed position. In order to open the valve the conduit end fitting has a probe therein to displace the valve stem into the open position when the conduit end fitting is attached to the external cylindrical end of the valve body. This oil drain valve has several deficiencies, such as having a deformable lip subject to breakage due to fatigue of the material forming the valve stem which will cause to valve to open when not desired. Further, a tool must be inserted, by the operator, into the valve opening to depress the valve stem in order to open the drain valve and a special tool, i.e. the conduit end fitting, is required in order hold the valve in an open position, absent the force proved by the operator.

The *Oil Drain Valve Assembly* disclosed in U.S. Pat. No. 5,096,158 to Douglas Burdick, et al. comprises a tubular assembly, for draining oil therethrough, adapted to be threaded into an engine crankcase and a sleeve assembly fit over a cylindrical section of the tubular assembly in a slidable fashion, the sleeve assembly having what amounts to a "plug" formed therein. There are a pair of diametrically opposed "J" slots provided on the side of the sleeve assembly for guiding the sleeve assembly along a pair of pins protruding from the side of the cylindrical section of the tubular assembly. The valve is closed by pushing the sleeve assembly upwards and rotating it clockwise to lock it into a closed position. To open the drain valve, the sleeve assembly is rotated counter clockwise and pulled downward thereby pulling the "plug" from the opening in the cylindrical end of the tubular assembly. A disadvantage of this oil drain valve is that there are no means provided to bias the valve into a closed position should the sleeve assembly accidentally be caused to open, thereby resulting in a loss of oil and damage to the engine. Likewise, should the pins become damaged so as to fail to hold the sleeve in position the oil will accidentally drain out of the engine.

The *Slidable Type Drain Cock* discussed in U.S. Pat. No. 2,506,722 by William J. Kuehn, et al. comprises a tubular housing comprising a threaded section adapted to be threaded into a component of an aircraft and a hexagonal nut section for assisting in the tightening or loosening of the tubular housing. A valve stem having a length greater than that of the tubular housing extends through both ends of the tubular housing. The end of the valve stem that extends from the threaded end of the tubular housing and into the aircraft component has a closed end comprising an annular groove for reception of an O-ring. The O-ring seats into the opening of the tubular housing through which the valve stem protrudes in order to seal the drain cock and aid in retaining the valve stem in assembled combination with the tubular housing when the drain cock is in a closed position. The valve stem comprises a drainage bore, and inlets are provided in the side of the valve stem adjacent the annular groove at closed end thereof to allow the fluid to drain into and through the drainage bore when the valve stem is depressed inwardly thereby lifting the O-ring from the seat in the tubular housing allowing the fluid to reach the inlets. A crossbar having inturned ends is provided at the outlet end of the valve stem to assist the operator in opening the drain cock. Further, when the drain cock is fully opened, the operator can turn the crossbar so that the inturned ends sit on the corners of the hex nut, or in grooves provided in the hex nut, so as to hold the drain cock in the open position. A spring, provided over a portion of the valve stem adjacent the crossbar and extended into a portion of the tubular housing, urges the valve stem into a closed position and the force of the spring must be overcome in order to open the drain cock. This drain cock has several disadvantages in that the spring is open to the environment and therefore subject to elements that can cause it to corrode and break. Further, the inturned ends of the crossbar can become damaged and therefore fail to hold the drain cock in the open position. Additionally, it is difficult to replace the spring because the drain cock is not easily disassembled.

SUMMARY OF THE INVENTION

Accordingly, it is a general object of the present invention to provide an improved drain valve with locking means for holding the drain valve in an open position which is relatively simple to manufacture and easily assembled or disassembled for repair, but yet overcomes the disadvantages of the prior art drain valves.

It is an object of the present invention to provide a drain valve which is simple in design and operation for draining fluids without requiring the use of tools.

It is another object of the present invention to provide a drain valve which is compact and facilitates easy drainage of the fluid.

It is still another object of the present invention to provide a drain valve with several safety features to prevent accidental opening of the drain valve and to prevent the accidental loss of fluid.

It yet still another object of the present invention provide a drain valve that has use as a replacement valve for most known drain valve and drain plugs currently in use, the drain valve comprising a threaded end which may be used to provide a self tapping operation in order to assist in threading the drain valve into the device having the fluid which is to be drained.

In accordance with these objectives, the present invention is comprised of a tubular housing assembly, a valve stem assembly and a biasing assembly. The tubular housing assembly is comprised of an internal section, a polygonal section and an external cylindrical section, wherein the internal section is adapted to be threaded into the device being drained, the polygonal section is adapted to receive a wrench for loosening or tightening the drain valve and cylindrical section provides means for assisting in locking the drain valve in an open position. The valve stem assembly is comprised of a valve stem having a closed end, an open end and a drainage bore nearly all the way therethrough in the longitudinal direction. The closed end of the valve stem comprises two annular grooves for receiving a C-clip and a first O-ring, and a diametric bore intersecting the drainage bore of the valve stem to form a pair of diametrically opposed inlets. The open end of the valve stem includes a circular actuator having a guide ball therein for operating in cooperation with the means for assisting in locking the drain valve in an open position of the cylindrical section of the tubular housing assembly. The spring assembly comprises a second O-ring, a spring retainer and a spring for biasing the drain valve into a closed position when not locked in the open position.

BRIEF DESCRIPTION OF THE DRAWINGS

These and further object, features, and advantages of the present invention will become more apparent from the following description when taken in connection with the accompanying drawings which show, for the purpose of illustration only, several embodiments in accordance with the present invention, with like numerals indicating corresponding parts throughout:

FIG. 3 is an exploded perspective view of the of the drain valve shown in FIG. 1A.

FIG. 4 is a cross sectional view of a further embodiment of the drain valve.

DESCRIPTION OF THE PREFERRED EMBODIMENTS

Figure 1A:
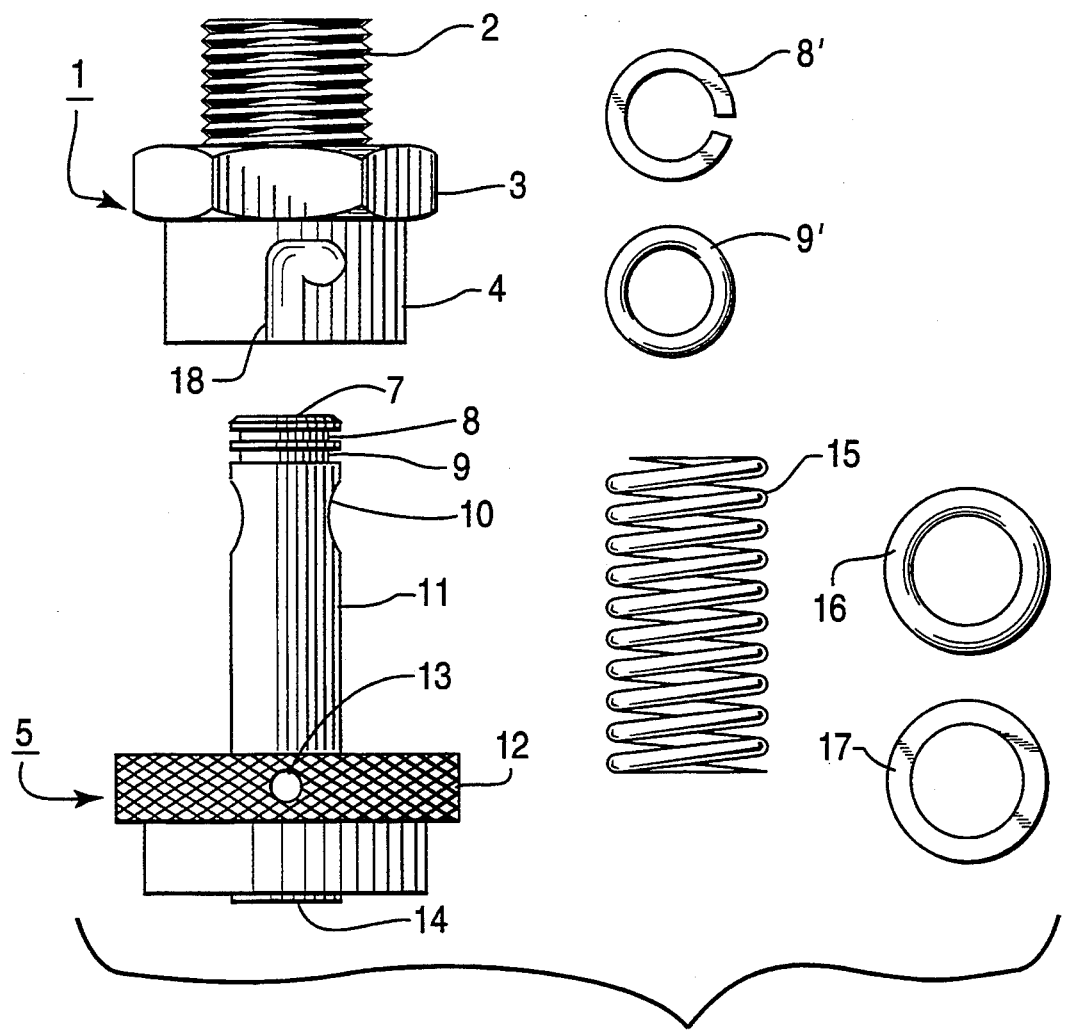
FIG. 1A is a disassembled view of a first embodiment of the drain valve construction showing the various parts thereof.

Referring now to the drawings, the first embodiment of the invention shown in FIG. 1A depicts a drain valve having tubular housing assembly 1 comprising an internal threaded section 2, a polygonal section 3 being preferably hexagonal in shape, and a cylindrical section 4 having an L-shaped actuate slot 18. The internal threaded section 2 is threaded to be rotated into a drain opening, such as in a drain pan of an automobile engine, but not limited thereto. The thread size depends on where tubular housing assembly 1 of the drain valve is to be installed, and may be comprised of self-tapping, or self cutting, threads. A valve stem assembly 5 comprises a closed end 7 of a tubular valve stem 11 having a pair of diametrically opposed inlets 10 for allowing passage of the fluid to be drained through the valve stem 11. Between the closed end 7 and the inlets 10 is a first annular groove 8 for receiving a C-clip 8' and a second annular groove 9 for receiving a first rubber O-ring 9'. Valve stem 11 is forcibly joined with actuator 12 so that an open end 14 of the valve stem 11 extends slightly through a center portion of the actuator 12, however it should be understood that the valve stem 11 and the actuator 12 can be one piece. A helical compression spring 15 fits over the valve stem 11 and fits into a bored opening in the tubular housing assembly 1. A second rubber O-ring 16 and a spring retainer 17 fit into the bored opening in the tubular housing assembly 1 between the compression spring 15 and a shoulder 25, FIG. 1B, formed in the bored opening in the tubular housing assembly 1. The second O-ring 16 provides a seal which prevents fluid from running down the outside of the valve stem 11. The tubular housing assembly 1 and the valve stem assembly 5 are preferably made of cadmium platted steel, but may be formed from brass, aluminum or even plastic, dependent upon the desired application of the drain valve.

FIG. 1A is a cross-sectional view of the assembled drain valve and shows a third O-ring 22 which may be desired in some applications. Operation of the drain valve will be discussed herein by reference to FIG. 1B. As shown, the drain valve is held in a closed position by the force provided by compression spring 15. In the closed position, fluid is prevented from passing into the drainage bore 6 through the inlets 10 of the valve stem 11 by the first O-ring 9' being forcibly seated into valve seat 26. The valve seat 26 is formed in the internal threaded section 2 and preferably has a 60 degree bevel for better sealing of the drain valve in the closed position. The first O-ring 9' holds the valve stem assembly 5 and the tubular housing assembly 1 together, and should the first O-ring 9' fail, the C-clip 8' keeps the valve stem assembly 5 from separating from the tubular housing assembly 1. There is provided in the actuator 12 a ball seat 13 in which a guide ball 24 is placed and held, wherein the guide ball 24 works in cooperation with the actuate slot 18 shown in FIG. 1A. To open the drain valve, the operator aligns the guide ball 24 with the actuate slot 18 and pushes the actuator so as to compress the compression spring 15. The pushing of the actuator 12 unseats the first O-ring 9' from the valve seat 26 and allows the inlets 10 to clear the valve seat 26 to allow fluid to drain into the drainage bore 6 through the inlets 10 and out of the open end 14 of the valve stem 11. The drain valve may held in the open position by the operator turning the actuator in a clockwise direction to seat the guide ball 24 into the "L" of the actuate slot 18. By turning the actuator 12 in the counter-clockwise direction to unseat the guide ball 24 from the "L" of the actuate slot 18, the compression spring 15 forces the first O-ring 9' into valve seat 26 to again close the drain valve.

Figure 2A:
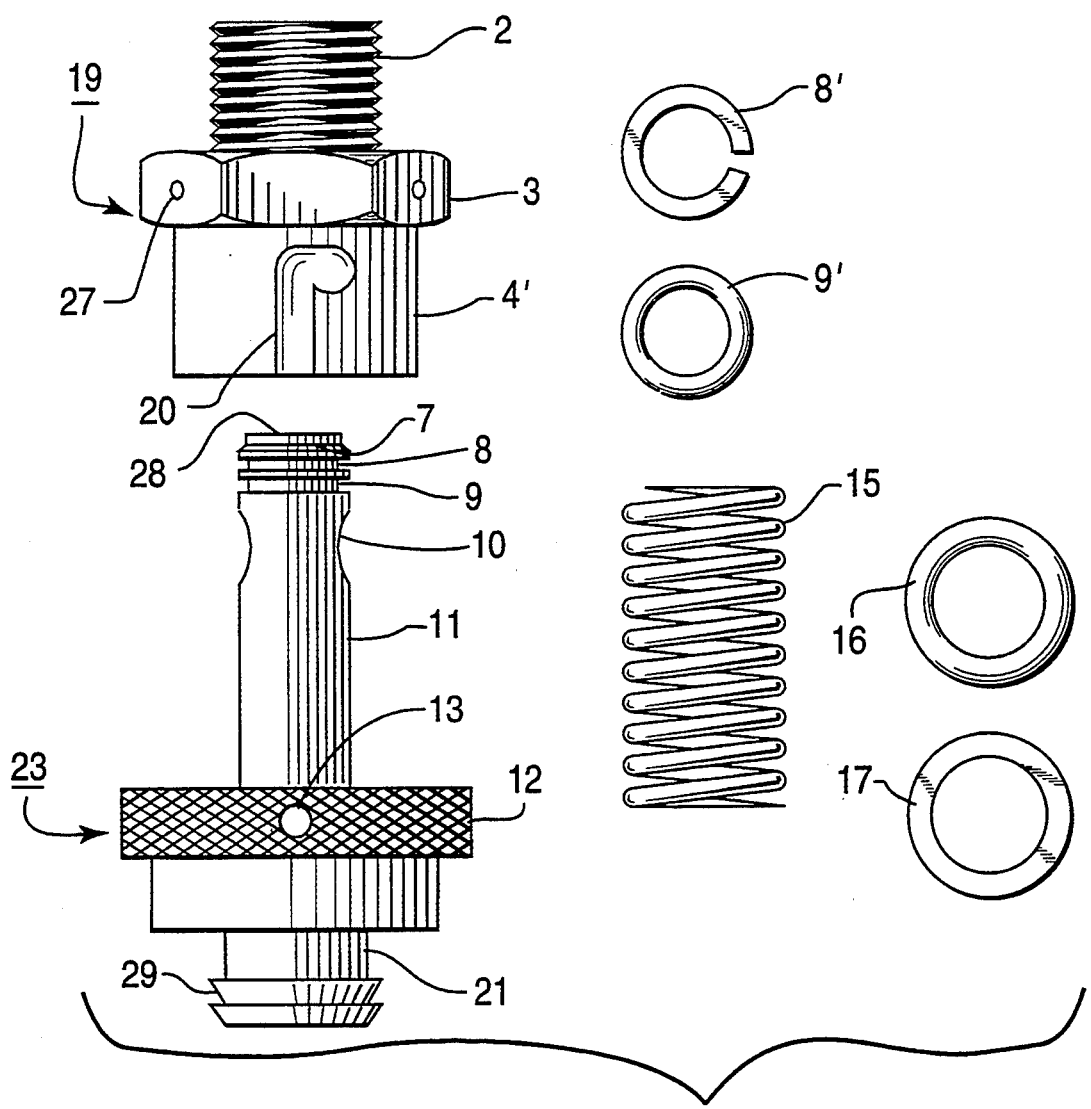
FIG. 2A is a disassembled view of a second embodiment of the drain valve construction showing the various parts thereof.

A second embodiment of the invention shown in FIG. 2A depicts a drain valve having tubular housing assembly 19 comprising an internal threaded section 2, a polygonal section 3 being preferably hexagonal in shape, and a cylindrical section 4' having an L-shaped actuate slot 20. The internal threaded section 2 is threaded to be rotated into a drain opening, such as in a drain pan of an automobile engine, but not limited thereto. The thread size depends on where tubular housing assembly 1 of the drain valve is to be installed, and may be comprised of self-tapping, or self cutting, threads. The tubular housing assembly 19 differs from that in FIG. 1A in that the cylindrical section 4' is longer than the cylindrical section 4, and there is a safety wire hole 27 in the polygonal section 3. The wire hole 27, which can also be used in the tubular housing assembly 1 of FIG. 1A, is necessary for preventing the tubular housing assembly from rotating when installed in fuel tank, such as in an aircraft, by passing a retaining safety wire (not shown) through the wire hole 27.

Valve stem assembly 23 comprises a magnet 28 connected to closed end 7 of tubular valve stem 11, wherein the valve stem 11 comprises a pair of diametrically opposed inlets 10 for allowing passage of the fluid to be drained through the valve stem 11. Between the closed end 7 and the inlets 10 is a first annular groove 8 for receiving a C-clip 8' and a second annular groove 9 for receiving a first rubber O-ring 9'. Valve stem 11 is forcibly joined with actuator 12, however it should be understood that the valve stem 11 and the actuator 12 can be one piece as shown in FIG. 4. Actuator 12 has a drain extension 21 which includes annular knurls 29 for reception of a drain hose (not shown) to facilitate fluid drainage. A helical compression spring 15 fits over the valve stem 11 and fits into a bored opening in the tubular housing assembly 19. A second rubber O-ring 16 and a spring retainer 17 fit into the bored opening in the tubular housing assembly 19 between the compression spring 15 and a shoulder 25, FIG. 2B, formed in the bored opening in the tubular housing assembly 19. The second O-ring 16 provides a seal which prevents fluid from running down the outside of the valve stem 11.

Figure 1B:
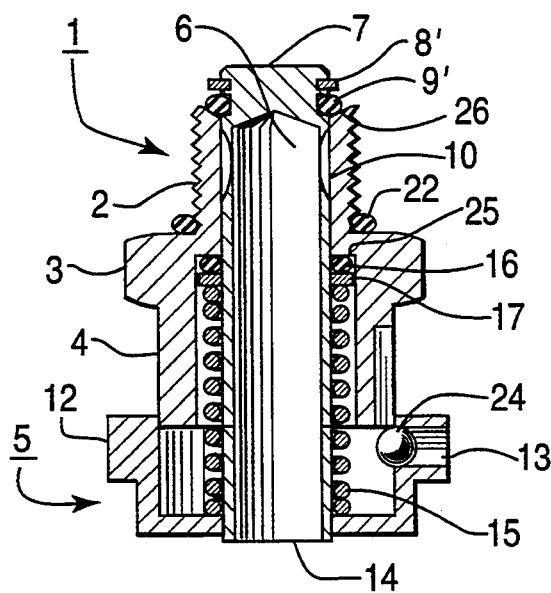
FIG. 1B is a cross sectional view of the drain valve shown in FIG. 1A.

FIG. 2A is a cross-sectional view of the assembled drain valve and shows a washer 22', instead of third O-ring 22 of FIG. 1B, which may be desired in some applications, wherein washer 22' may be a lock washer, a teflon washer, etc. Additionally, closed end 7 includes a pilot hole 7' in which pin 28' is pressed to mount magnet 28 to the closed end 7 of the valve stem 11. Operation of the drain valve will be discussed herein by reference to FIG. 2B. As shown, the drain valve is held in a closed position by the force provided by compression spring 15. In the closed position, fluid is prevented from passing into the drainage bore 6 through the inlets 10 of the valve stem 11 by the first O-ring 9' being forcibly seated into valve seat 26. The valve seat 26 is formed in the internal threaded section 2 and preferably has a 60 degree bevel. The first O-ring 9' holds the valve stem assembly 23 and the tubular housing assembly 1 together, and should the first O-ring 9' fail, the C-clip 8' keeps the valve stem assembly 23 from separating from the tubular housing assembly 1. There is provided in the actuator 12 a ball seat 13 in which a guide ball 24 is placed and held, wherein the guide ball 24 works in cooperation with the actuate slot 20 shown in FIG. 2A. Due to the longer length of cylindrical section 4', actuate slot 20 is longer than actuate slot 18 of FIG. 1A, and the tubular housing assembly 19 is prevented from rotating by guide ball 24 already being aligned with the actuate slot 20. Since the tubular housing assembly 19 is prevented from rotating then the operator does not need to waste time trying to align the guide ball 24 with the actuate slot 20 and the valve seat 26 will not provide undue wear on the first O-ring 9'. To open the drain valve, the operator pushes the actuator 12 so as to compress the compression spring 15. The pushing of the actuator 12 unseats the first O-ring 9' from the valve seat 26 and allows the inlets 10 to clear the valve seat 26 to allow fluid to drain into the drainage bore 6 through the inlets 10 and out of the drain extension 21 of the valve stem assembly 23. The drain valve may held in the open position by the operator turning the actuator in a clockwise direction to seat the guide ball 24 into the "L" of the actuate slot 20. By turning the actuator 12 in the counter-clockwise direction to unseat the guide ball 24 from the "L" of the actuate slot 20, the compression spring 15 forces the first O-ring 9' into valve seat 26 to again close the drain valve.

Note that the tubular housing assemblies 1 and 19 have a tubular bore of a first diameter with which the outer diameter of the valve stem 11 is slidably engaged and a second bore of a larger diameter for accommodating the combination of the valve stem 11 and the compression spring 15. The first bore and the second bore are formed along the same longitudinal center of the tubular housing assembly and the junction of the first bore and the second bore form shoulder 25. Additionally, the actuator 12 has a first bore of a diameter in which the valve stem 11 must be pressed in order for the valve stem 11 to be joined with the actuator 12 to form the valve stem assembly, and a second bore of a diameter with which the outer diameter of the cylindrical sections 4 or 4' is slidably engaged.

FIG. 3 shows an exploded view of the invention shown in FIG. 1 showing the parts of the drain valve in the order of assembly. The removal of the C-clip 8' from the first annular groove 8 and the first O-ring 9' from the second annular groove 9 allows the drain valve to be easily assembled and disassembled. Note that the guide ball 24 will not fall from the ball seat 13 due to the diameter of the guide ball 24 as compared to the diameter of the ball seat 13. Also, the cylindrical section 4, or 4', will provide a protective cover over the compression spring 15 thereby preventing debris, which could damage the compression spring 15, from coming into contact with the compression spring 15. Cylindrical section 4 also prevents dirt, etc., which could prevent the compression spring 15 from being easily compressed, from building up around compression spring 15.

FIG. 4 represents a cross-sectional view of a fourth embodiment of the assembled drain valve. The components of FIG. 4 that are similar to those shown in FIGS. 1A–2B have the same reference numerals, and the difference between FIG. 4 and FIG. 2B will be discussed below. The valve stem assembly 30 is machined as one piece, instead of the actuator 12 and valve stem 11 being pressed together as discussed above with regard to FIGS. 1A–2B. Accordingly, the open end 14' of the valve stem 11 will not extend slightly below the actuator 12 as discussed with regard to FIG. 1A. Additionally, the ball seat 13 is replaced with a threaded hole 31 and the guide ball 24 is replaced with an allen set screw.

Figure 2B:
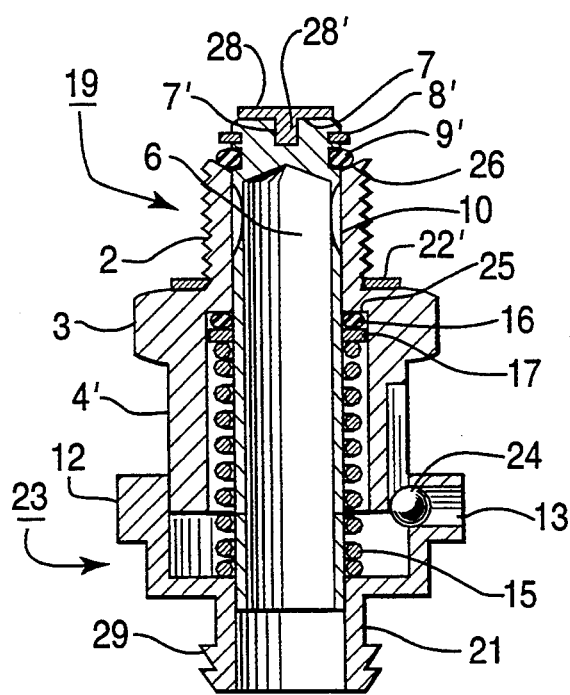
FIG. 2B is a cross sectional view of the drain valve shown in FIG. 2A.

The foregoing description of the preferred embodiments of the inventive drain valve are provided as examples, and the scope of the invention is not limited to the exact details of the construction shown. For example, an E-clip could be used instead of the illustrated C-clip 8'. Additionally, the embodiments shown in FIGS. 3B and 4 may not include the pilot hole 7' or magnet 28. Also, the embodiment shown in FIG. 4 can include the drain extension 21 which includes annular knurls 29 as shown in FIGS. 2A–2B, wherein the drain extension 21 which includes annular knurls 29, the actuator 12 and the valve stem 11 will be machined as one piece. It is appreciated that these and other modifications to the inventive concepts may be apparent to those of ordinary skill in the art without departing from the spirit and scope of the invention.

We claim:
1. A drain valve comprising, in combination:
   a tubular housing assembly comprising:
      a threaded section for threading said tubular housing assembly into a drain hole,
      a cylindrical section and a polygonal nut section located between the threaded section and the cylindrical section,
      a first bore of a first diameter and a second bore, axially aligned with said first bore, of a second diameter larger than said first diameter, a junction of said first bore and said second bore forming a shoulder;
   a valve stem assembly comprising:
      a valve stem having an outer diameter slidably engaging the first bore of said tubular housing assembly, said valve stem comprising:
         a closed end having a first annular groove for reception of a C-clip and second annular groove for reception of a first O-ring, said first and second annular grooves being formed in the outer circumference of the closed end of said valve stem, an open end,
         a drainage bore extending from said open end to said closed end, and a pair of diametrically opposed inlets adjacent said closed end for permitting fluid external to said valve stem to pass into said drainage bore;

an actuator having a small diameter bore, said valve stem being press fit into said small diameter bore in order for the valve stem to be joined with the actuator to form the valve stem assembly, and a large diameter bore slidably engaging an outer diameter of the cylindrical section of said tubular housing assembly; and a compression spring slidably disposed over said valve stem and further disposed between said shoulder of said tubular housing assembly and said actuator, said compression spring providing a force for closing said drain valve by axially urging said actuator away from said cylindrical section.

2. The drain valve as set forth in claim 1, further comprising:

a second O-ring disposed to abut said shoulder and a spring retaining means disposed between said second O-ring and said compression spring.

3. The drain valve as set forth in claim 1, said threaded section further comprising a valve seat for receiving said first O-ring to seal said drain valve when said compression spring provides said force for closing said drain valve.

4. The drain valve as set forth in claim 3, said valve seat being formed from a 60 degree bevel in an end of said threaded section of said tubular housing assembly through which said valve stem extends.

5. The drain valve as set forth in claim 1, said actuator further comprising a ball seat and a guide ball mounted in said ball seat for enabling said drain valve to be opened.

6. The drain valve as set forth in claim 5, said cylindrical section further comprising an actuate slot for guiding said guide ball and for enabling said drain valve to remain in an open position.

7. The drain valve as set forth in claim 6, wherein said actuate slot has an "L" shape.

8. The drain valve as set forth in claim 1, said valve stem further comprising:

a mounting bore in said closed end and aligned axially along the longitudinal center of said valve stem; and a magnet having a diameter approximately equal to the diameter of said valve stem, said magnet having a mounting pin for insertion into said mounting bore for mounting said magnet to said valve stem.

9. The drain valve as set forth in claim 1, said actuator further comprising:

a drainage extension having a pair of annular knurls for facilitating drainage of a fluid through a drain hose.

10. The drain valve as set forth in claim 1, said polygonal nut section being hexagonal in shape and comprising safety wire holes therein for attachment to a safety wire.

11. A drain valve comprising, in combination:

a tubular housing assembly comprising:

a threaded section for threading said tubular housing assembly into a drain hole, a cylindrical section and a polygonal nut section located between the threaded section and the cylindrical section, a first bore of a first diameter and a second bore, axially aligned with said first bore, of a second diameter larger than said first diameter, a junction of said first bore and said second bore forming a shoulder;

a valve stem assembly comprising:

an actuator having a small diameter bore forming an opening through which fluid is drained, and a large diameter bore slidably engaging an outer diameter of the cylindrical section of said tubular housing assembly; and a valve stem having an outer diameter slidably engaging the first bore of said tubular housing assembly, said valve stem comprising:

a closed end having a first annular groove for reception of a C-clip and second annular groove for reception of a first O-ring, said first and second annular grooves being formed in the outer circumference of said closed end of said valve stem, a drainage bore extending from said closed end through said small diameter bore forming said opening in said actuator, said actuator and said valve stem being machined as one integral, monolithic component, and a pair of diametrically opposed inlets located adjacent to said closed end for permitting fluid external to said valve stem to pass into said drainage bore; and a compression spring slidably disposed over said valve stem and further disposed between said shoulder of said tubular housing assembly and said actuator, said compression spring providing a force for closing said drain valve by axially urging said actuator away from said cylindrical section.

12. The drain valve as set forth in claim 11, further comprising:

a second O-ring disposed to abut said shoulder and a spring retaining means disposed between said second O-ring and said compression spring.

13. The drain valve as set forth in claim 11, said threaded section further comprising a valve seat for receiving said first O-ring to seal said drain valve when said compression spring provides said force for closing said drain valve.

14. The drain valve as set forth in claim 13, said valve seat being formed from a 60 degree bevel in an end of said threaded section of said tubular housing assembly through which said valve stem extends.

15. The drain valve as set forth in claim 11, said actuator further comprising a threaded hole and an allen hex screw mounted in said threaded hole seat for enabling said drain valve to be opened.

16. The drain valve as set forth in claim 15, said cylindrical section further comprising an actuate slot for guiding said allen hex screw and for enabling said drain valve to remain in an open position.

17. The drain valve as set forth in claim 16, wherein said actuate slot has an "L" shape.

18. The drain valve as set forth in claim 11, said valve stem further comprising:

a mounting bore in said closed end and aligned axially along the longitudinal center of said valve stem; and a magnet having a diameter approximately equal to the diameter of said valve stem, said magnet having a mounting pin for insertion into said mounting bore for mounting said magnet to said valve stem.

19. The drain valve as set forth in claim 11, said actuator further comprising:

a drainage extension having a pair of annular knurls for facilitating drainage of a fluid through a drain hose.

20. The drain valve as set forth in claim 11, said polygonal nut section being hexagonal in shape and comprising safety wire holes therein for attachment to a safety wire.

21. A drain valve comprising, in combination:
 a tubular housing assembly comprising:
  a threaded section for threading said tubular housing assembly into a drain hole,
  a cylindrical section and a polygonal nut section located between the threaded section and the cylindrical section,
  a first bore of a first diameter and a second bore, axially aligned with said first bore, of a second diameter larger than said first diameter, a junction of said first bore and said second bore forming a shoulder;
 a valve stem assembly comprising:
  an actuator having a small diameter bore forming an opening through which fluid is drained, and a large diameter bore with which an outer diameter of the cylindrical section of said tubular housing assembly is slidably engaged; and
  a valve stem having an outer diameter which slidably engages the first bore of said tubular housing assembly, said valve stem comprising:
   a closed end having a first annular groove for reception of a C-clip and second annular groove for reception of a first O-ring, said first and second annular grooves being formed in the outer circumference of said closed end of said valve stem,
   a drainage bore extending from said closed end through said small diameter bore forming said opening in said actuator, and
   a pair of diametrically opposed inlets adjacent to said closed end for permitting fluid external to said valve stem to pass into said drainage bore; and
 a compression spring slidably disposed over said valve stem and further disposed between said shoulder of said tubular housing assembly and said actuator, said compression spring providing a force for closing said drain valve by axially urging said actuator away from said cylindrical section.

22. The drain valve as set forth in claim 21, further comprising said actuator and said valve stem being machined as one component.

23. The drain valve as set forth in claim 21, further comprising said valve stem and said small diameter bore being formed as two separate components, wherein said valve stem and said small diameter bore are pressed together in order for the valve stem to be joined with the actuator to form the valve stem assembly.

* * * * *